Jan. 20, 1925.

J. J. McEWAN 1,523,700

MOLDING MACHINE

Filed March 1, 1923   3 Sheets-Sheet 1

Witnesses
Charles H. Buckler
George A. Gruss

Inventor
John J. McEwan
By Joshua R. H. Potts
His Attorney

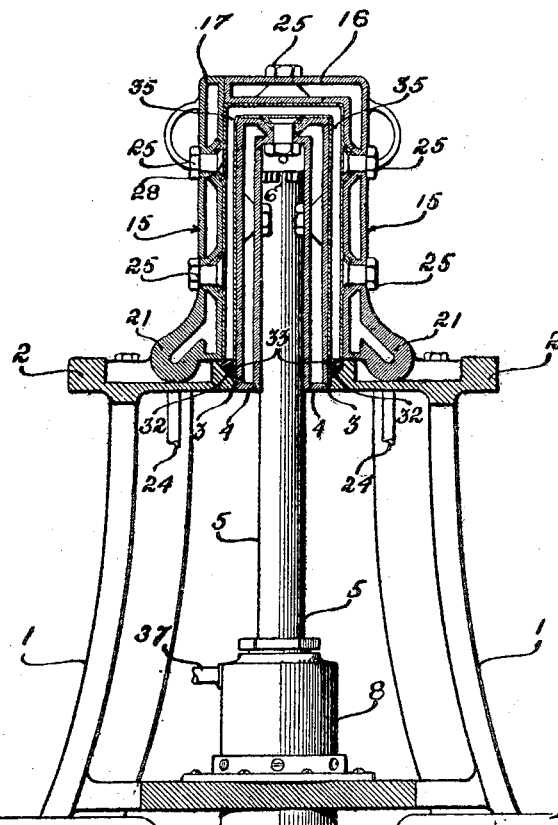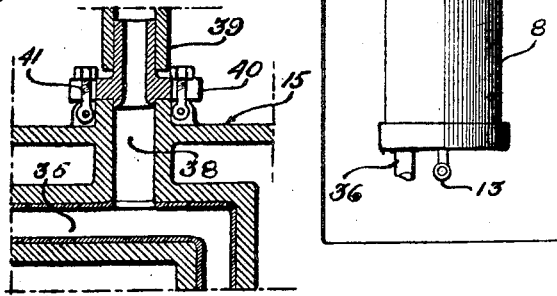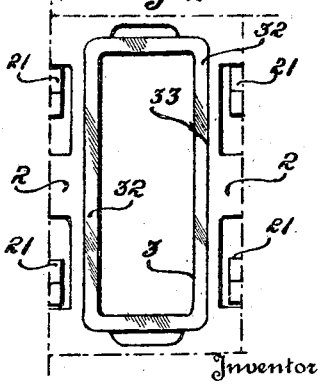

Jan. 20, 1925.  
J. J. McEWAN  
MOLDING MACHINE  
Filed March 1, 1923  
1,523,700  
3 Sheets-Sheet 3

Witnesses  
Charles H. Buckler  
George A. Gross

Inventor  
John J. McEwan  
By Joshua R. H. Potts  
His Attorney

Patented Jan. 20, 1925.

1,523,700

UNITED STATES PATENT OFFICE.

JOHN J. McEWAN, OF TRENTON, NEW JERSEY.

MOLDING MACHINE.

Application filed March 1, 1923. Serial No. 622,024.

*To all whom it may concern:*

Be it known that I, JOHN J. MCEWAN, a citizen of the United States, residing at Trenton, in the county of Mercer and State of New Jersey, have invented certain new and useful Improvements in Molding Machines, of which the following is a specification.

My invention relates to molding machines and its object is to provide a machine which will produce a product of any desired density, increase the present production and decrease the cost of the same.

This object, and other advantageous ends which will be described hereinafter, I attain in the following manner, reference being had to the accompanying drawings in which—

Figure 1:
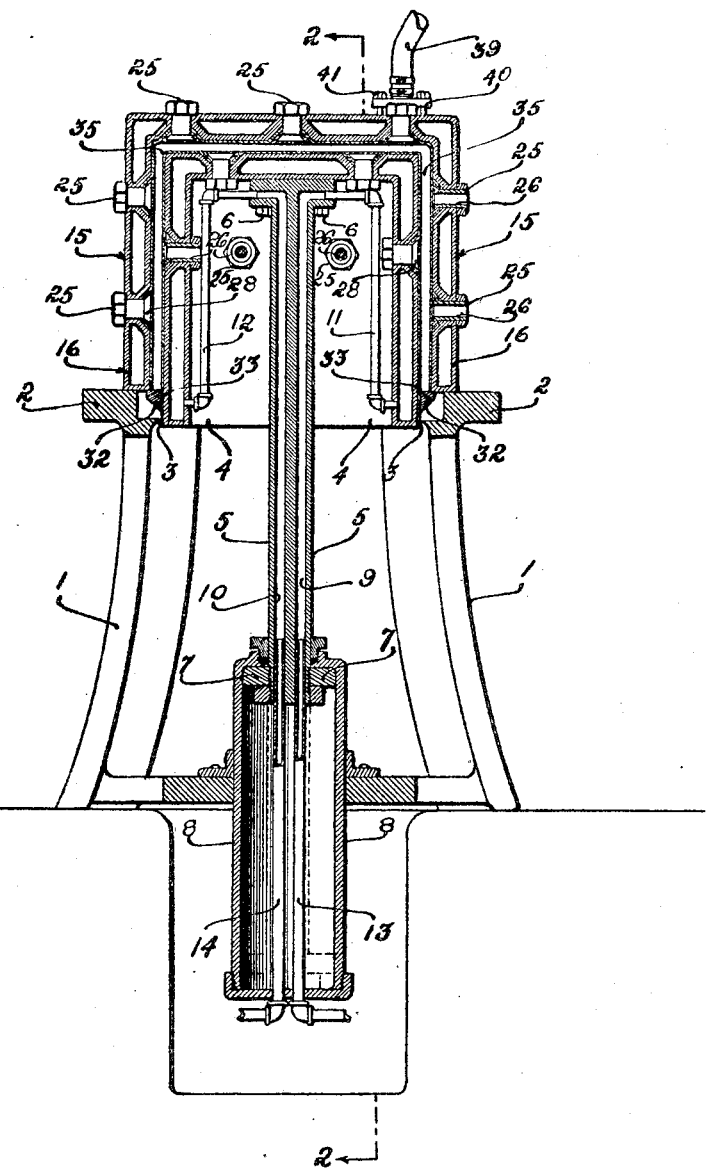
Figure 3:
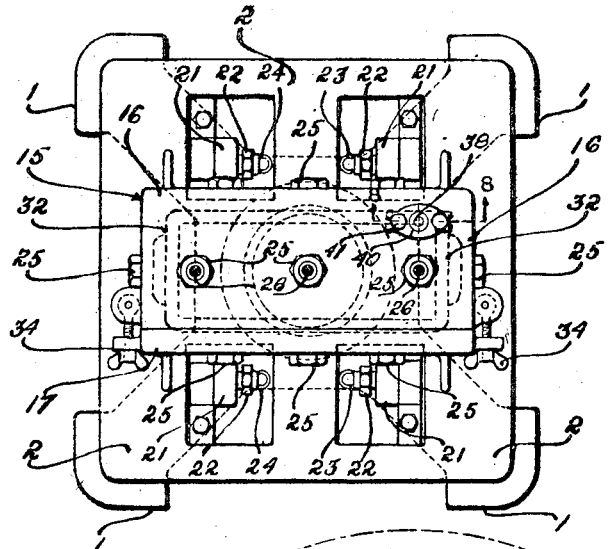
Figure 4:
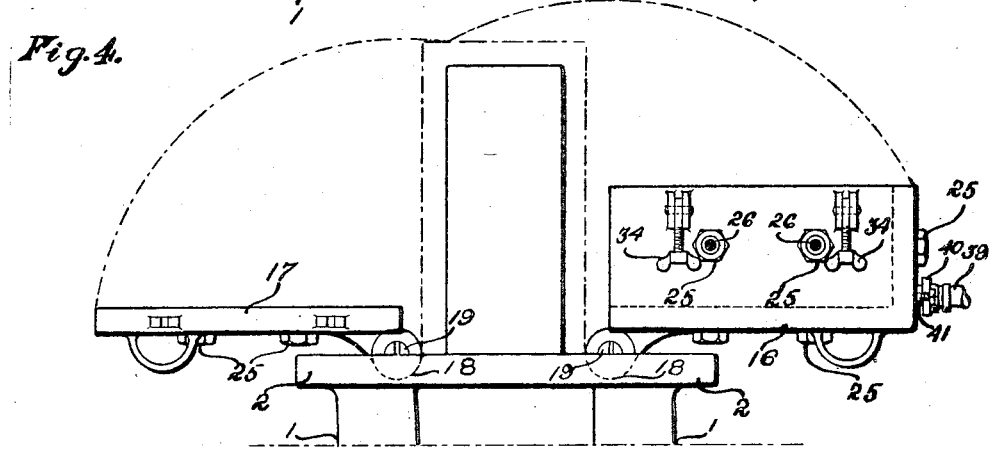
Figure 5:
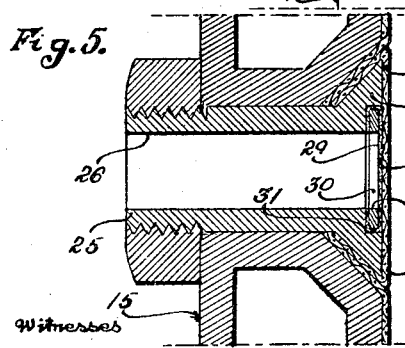
Figure 6:
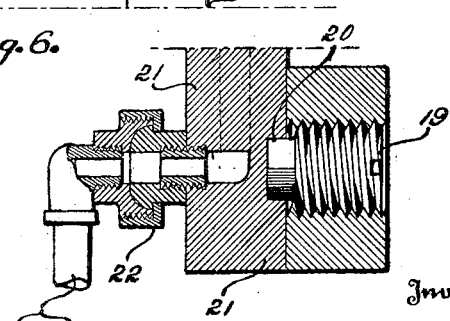

Figure 1 is a central vertical section through a molding machine constructed in accordance with my invention, Figure 2 a section on line 2—2 of Figure 1, Figure 3 a plan view of the machine shown in Figure 1, Figure 4 a side elevation illustrating the machine with the mold sections in their open positions, Figure 5 an enlarged central section through the lining securing means and moisture outlet, Figure 6 a central section partly in full through the hinge of the mold sections, Figure 7 a fragmentary plan view of the bed showing the remover in place, and Figure 8 a section on line 8—8 of Figure 3.

My invention may be used for numerous purposes which require means for molding plastic material into any desired shape and density. For the purpose of illustration I have shown my machine as applied in molding flush tanks.

Referring to the drawings, 1 indicates a bed of any suitable shape, 2 a top on the bed having an opening 3. A jacketed inside mold 4 is adapted to slide within the opening. The movement of the inside mold is imparted by a piston rod 5 having one end connected thereto at 6 and a piston 7 on the other end secured in any suitable manner. The piston travels in a cylinder 8 secured to the bed. The piston rod is provided with an inlet conduit 9 and an outlet conduit 10. The inlet conduit is connected to the jacketed inside mold by a pipe 11 and the outlet conduit is connected to the mold by a pipe 12.

In order that the piston may slide in the cylinder, I provide connections to the inlet and outlet conduits by pipes 13 and 14 which make a sliding fit with the conduits. A heating fluid may pass through pipe 13 into conduit 9 and into the mold, the heating fluid passing out of pipe 14. An outside mold 15 made in sections 16 and 17 is hinged to the bed at 18 by screws 19 which have lugs 20 projecting into a corresponding opening in bosses 21 on the mold sections. The heating fluid passes into the mold sections through the hinge bosses which are hollow and for this purpose I have provided swinging joints 22 connected to the inlet and outlets of the bosses. The heating fluid enters the molds through pipes 23 and passes out through pipes 24.

The outside and inside molds are lined with absorbing materials such as cloth. The lining may be held in place by bolts 25 provided with moisture outlets 26. The heads of the bolts are covered with separate pieces of lining 27 and held in place by the tapered head 28 of the bolt. To prevent bulging of the lining parts 27 into the moisture outlets, I provide a reinforcing screen 29 secured to the bolts by washers 30. The washers and the screen are forced in a counter-bore 31 in the bolt.

When my machine is used for molding flush tanks, a remover 32 is placed around opening 3 which is provided with walls 33 conforming to the shape of the remover so that a vertical wall is provided in the opening when the remover is in position. The outside mold sections are swung on their hinges from the position shown in Figure 4 to the position shown in Figure 3 and clamped together by wing nuts 34. The inside mold is moved into position within the outside mold so that a space 35 is provided between the molds. The movement of the inside mold is controlled by admitting steam or other fluid under pressure into pipes 36 or 37. Any arrangement may be provided for the pipes which permits the fluid to pass into one end of the cylinder and out of the other. The machine is then in position to receive the plastic material. For admitting the plastic material into the space 35, I provide an inlet 38 in the top of the outside mold. A pipe or rubber hose 39 is connected to the inlet by a gland 40 and toggle bolts 41 so that a quick connection and disconnection of the hose 39 is possible. The plastic material is then forced into the opening through the hose by a force pump of any suitable character until space 35 is filled. When the space is filled, a continued pressure of the plastic material will increase its density and produce a tank of any desired density. Any suitable gage may be used to measure the density. The heating fluid is then admitted into the jackets of the molds. The heating of the plastic material by the mold is continued for a predetermined time depending on the density of the plastic material. During the heating, the plastic material becomes partly dried by the lining which absorbs liquid which is changed into moisture by contact with the hot molds, the moisture then passing out of the moisture outlets. After the plastic material is partly dried and in a semi-plastic state, the molds are removed and the molded flush tank which rests on the remover may be removed by lifting the remover from the bed. Another remover is placed around the opening in the bed. The machine is then set up again for molding another tank.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A molding machine including a jacketed outside mold having moisture outlets passing through its walls; a jacketed inside mold spaced from the outside mold and having moisture outlets passing through its walls, each of the moisture outlets communicating with the space between the molds; means for admitting a heating fluid into the molds, and means for moving one mold relatively to the other.

2. A molding machine including a jacketed outside mold lined with absorbing material; a jacketed inside mold lined with absorbing material; means for admitting a heating fluid into the molds, and means for moving one mold relatively to the other.

3. A molding machine including a jacketed outside mold lined with absorbing material and having moisture outlets; a jacketed inside mold lined with absorbing material and having moisture outlets; means for admitting a heating fluid to the molds, and means for moving one mold relatively to the other.

4. A molding machine including a jacketed outside mold lined with absorbing material; a jacketed inside mold lined with absorbing material; means for holding the lining to the mold and providing a moisture outlet; means for admitting a heating fluid to the mold, and means for moving the inside mold relatively to the outside mold.

5. A molding machine including a jacketed outside mold lined with absorbing material; a jacketed inside mold lined with absorbing material; hollow bolts for holding the lining to the molds; means for admitting a heating fluid into the molds, and means for moving one mold relatively to the other.

6. A molding machine including a jacketed outside mold lined with absorbing material; a jacketed inside mold lined with absorbing material; hollow bolts for holding the lining to the molds; a screen in the head of the bolt for reinforcing the lining; means for admitting heating fluid to the molds, and means for moving one mold relatively to the other.

7. A molding machine including a bed; a jacketed outside mold movably mounted on the bed; a jacketed inside mold movably mounted on the bed and adapted to be disposed within and spaced from the outside mold; a member removably mounted on the bed for supporting the article molded within the space whereby the article and member may be bodily removed from the bed, and means for admitting a heating fluid into the molds.

8. A molding machine including a bed having an opening; an outside mold mounted on the bed and having its upper end closed and its lower end open; an inside mold adapted to pass through the opening into the outside mold and spaced therefrom; a remover supported by the bed around the periphery of the opening and closing the space between the molds whereby the molded article and remover may be bodily removed from the bed, and means for admitting a heating fluid into the molds.

9. A molding machine including a bed; jacketed outside mold sections hinged to the bed; a jacketed inside mold mounted to move into and out of the outside mold; means for admitting a heating fluid into the molds, and means for moving the inside mold relatively to the outside mold.

10. A molding machine including a bed; jacketed outside mold sections hinged to the bed; an inside mold mounted to move into and out of the outside mold; a member removably mounted on the bed for supporting the molded article whereby the article and member may be bodily removed from the bed, and means for admitting a heated fluid into the molds.

11. A molding machine including a bed; jacketed mold sections hinged to the bed and having conduits passing through their hinges for admitting a heating fluid to the jackets; a jacketed inside mold mounted to move relatively to the outside mold, and means for admitting a heating fluid to the inside mold.

12. A molding machine including a bed; a jacketed outside mold; means for admitting a heating fluid to the mold; a jacketed inside mold; a cylinder secured to the bed; a piston in the cylinder; a piston rod connected to the cylinder and the inside mold and having conduits therein connected to the jacket of the inside mold, and pipes in the cylinder sliding in the conduits adapted to admit a heating fluid in one conduit and permit discharge from the other conduit.

13. A molding machine including a bed having an opening; jacketed outside mold sections, lined with absorbing material, hinged to the bed; a jacketed inside mold, lined with absorbing material, adapted to pass through the opening into the outside mold and being normally spaced therefrom; a remover supported by the bed around the periphery of the opening and closing the space between the molds whereby the molded article and the remover may be bodily removed from the bed, and means for admitting a heating fluid into the inside mold.

14. A molding machine including a bed having an opening; jacketed inside mold sections, lined with absorbing material and having moisture outlets, hinged to the bed; a jacketed inside mold lined with absorbing material and having moisture outlets, adapted to pass through the opening into the outside mold and being normally spaced therefrom; a remover supported by the bed around the periphery of the opening and closing the space between the molds whereby the molded article and remover may be bodily removed from the bed, and means for admitting a heating fluid into the molds.

In testimony whereof I have signed my name to this specification in the presence of two subscribing witnesses.

JOHN J. McEWAN.

Witnesses:
  JAMES J. KELLY,
  FRED L. MAIORINO.